US011640552B2

(12) United States Patent
Nagai et al.

(10) Patent No.: US 11,640,552 B2
(45) Date of Patent: May 2, 2023

(54) TWO STAGE TRAINING TO OBTAIN A BEST DEEP LEARNING MODEL WITH EFFICIENT USE OF COMPUTING RESOURCES

(71) Applicant: International Business Machines Corporation, Armonk, NY (US)

(72) Inventors: Shingo Nagai, Tokyo (JP); Kohhei Nomura, Fujisawa (JP)

(73) Assignee: International Business Machines Corporation, Armonk, NY (US)

(*) Notice: Subject to any disclaimer, the term of this patent is extended or adjusted under 35 U.S.C. 154(b) by 738 days.

(21) Appl. No.: 16/589,613

(22) Filed: Oct. 1, 2019

(65) Prior Publication Data

US 2021/0097434 A1 Apr. 1, 2021

(51) Int. Cl.
*G06N 20/00* (2019.01)
*G06F 9/50* (2006.01)

(52) U.S. Cl.
CPC ............. *G06N 20/00* (2019.01); *G06F 9/505* (2013.01); *G06F 9/5055* (2013.01)

(58) Field of Classification Search
CPC .......... G06N 20/00; G06N 3/08; G06N 3/063; G06N 3/0454; G06N 7/005; G06N 5/04; G06N 99/005; G06F 9/48; G06F 9/50; G06F 9/505; G06F 9/4881; G06F 9/4883; G06F 9/5055; H04R 25/507
USPC .......................................................... 706/12
See application file for complete search history.

(56) References Cited

U.S. PATENT DOCUMENTS

| 10,147,041 | B2* | 12/2018 | Gao | G06Q 30/0241 |
| 11,315,013 | B2* | 4/2022 | Savic | G06F 9/45541 |
| 2015/0363688 | A1* | 12/2015 | Gao | G06N 3/04 706/27 |
| 2016/0307096 | A1* | 10/2016 | Goel | G06N 3/08 |
| 2017/0228645 | A1* | 8/2017 | Wang | G06N 3/045 |

(Continued)

FOREIGN PATENT DOCUMENTS

WO 2019067960 A1 4/2019

OTHER PUBLICATIONS

"Early stopping", Wikipedia, last edited on Feb. 18, 2019, 4 pages, <https://en.wikipedia.org/wiki/Early_stopping>.

(Continued)

*Primary Examiner* — James N Fiorillo
(74) *Attorney, Agent, or Firm* — Edward P. Li

(57) ABSTRACT

A computer-implemented method, a computer program product, and a computer system for efficient use of computing resources in two stage training of a deep learning model. A computer executes a first first-stage training job to train a deep learning model. The computer finishes the first first-stage training job by using early stopping and then registers a first second-stage training job to train a deep learning model that has been trained in the first first-stage training job. The computer executes the first second-stage training job with a small number of epochs. The computer interrupts the first second-stage training job and executes a second first-stage training job, in response to receiving a registration of the second first-stage training job. The computer interrupts the first second-stage training job and executes a second second-stage training job that has a higher priority, in response to receiving a registration of the second second-stage training job.

17 Claims, 8 Drawing Sheets

(56) References Cited

U.S. PATENT DOCUMENTS

| | | | | |
|---|---|---|---|---|
| 2018/0218502 | A1* | 8/2018 | Golden | G06T 7/136 |
| 2019/0042936 | A1* | 2/2019 | Guim Bernat | G06N 5/04 |
| 2019/0114537 | A1* | 4/2019 | Wesolowski | G06N 3/084 |
| 2019/0114544 | A1* | 4/2019 | Sundaram | G06F 18/24 |
| 2019/0222943 | A1* | 7/2019 | Andersen | H04R 25/507 |
| 2020/0151606 | A1* | 5/2020 | Dirac | G06N 20/00 |
| 2020/0175384 | A1* | 6/2020 | Zhang | G06N 3/088 |
| 2020/0327420 | A1* | 10/2020 | Aralikatte | G06N 3/045 |
| 2020/0365229 | A1* | 11/2020 | Fields | G16B 25/00 |
| 2020/0372327 | A1* | 11/2020 | Qiu | G06F 17/16 |
| 2020/0380675 | A1* | 12/2020 | Golden | G06T 7/11 |
| 2021/0056108 | A1* | 2/2021 | Shmueli | G06N 5/04 |
| 2021/0216854 | A1* | 7/2021 | Zhou | G06N 3/063 |
| 2021/0345971 | A1* | 11/2021 | Billings | A61B 5/444 |
| 2022/0067527 | A1* | 3/2022 | Xu | H03M 7/702 |
| 2022/0335611 | A1* | 10/2022 | Seong | G06T 7/11 |

OTHER PUBLICATIONS

Mell et al., "The NIST Definition of Cloud Computing", National Institute of Standards and Technology, Special Publication 800-145, Sep. 2011, 7 pages.

* cited by examiner

TWO STAGE TRAINING TO OBTAIN A BEST DEEP LEARNING MODEL WITH EFFICIENT USE OF COMPUTING RESOURCES

BACKGROUND

The present invention relates generally to deep learning model training, and more particularly to two stage training to obtain a best deep learning model with efficient use of computing resources.

In deep learning model training, it is important to find a condition to stop the training in order to obtain the best model. If the training is stopped too early, enough accuracy cannot be obtained. On the other hand, if the training is stopped too late, the model can overfit to the training dataset and accuracy tends to be low for test datasets.

In order to prevent overfitting, the early stopping method has been widely used, which stops training before reaching a maximum limit of training iterations. The early stopping is a method that stops the training when a pre-defined stop condition to prevent the overfitting is met. For example, the training is stopped when the best accuracy of the validation dataset has not been updated three times consecutively (this parameter is called "patience", which is three in this example). The early stopping method enables users to obtain the model which is well-trained to some extent but not overfitting to the training dataset. However, in the early stopping method, the best "patience" parameter tends to be different depending on a target problem, so that trial and error is used to find the best parameter for early stopping. If the training continues to be run even after the early stopping, a better model may be obtained; however, without advancing the training, it's not possible to know whether continuing to run can obtain the better model. Therefore, it is necessary to determine an appropriate parameter and judge from evaluation results of different parameters.

For the problem of the early stopping method, the method using checkpoints may be a solution. The method using checkpoints saves a snapshot every time when a best score of a monitoring value (e.g., accuracy) is updated, and it takes a best model selected from snapshots after reaching a maximum limit of training iterations. Although the best model can be obtained by the method using checkpoints, it is need to wait for finishing a training job until a maximum limit of training iterations is reached. However, reaching the maximum limit takes too much training time. In deep learning model training, it generally takes hours or more than a day to train a model with enough accuracy even by using a high performance computing resource.

SUMMARY

In one aspect, a computer-implemented method for efficient use of computing resources in two stage training of a deep learning model is provided. The computer-implemented method includes executing, by a computer, a first first-stage training job to train a deep learning model. The computer-implemented method further includes finishing, by the computer, the first first-stage training job, by using early stopping. The computer-implemented method further includes registering, by the computer, a first second-stage training job to train a deep learning model that has been trained in the first first-stage training job, in response to the first first-stage training job being finished. The computer-implemented method further includes executing, by a computer, the first second-stage training job with a small number of epochs. The computer-implemented method further includes finishing, by the computer, the small number of epochs in the first second-stage training job and executing a second first-stage training job, in response to receiving a registration of the second first-stage training job. The computer-implemented method further includes finishing, by the computer, the small number of epochs in the first second-stage training job and executing a second second-stage training job that has a higher priority than the first second-stage, in response to receiving a registration of the second second-stage training job.

In another aspect, a computer program product for efficient use of computing resources in two stage training of a deep learning model is provided. The computer program product comprising one or more computer-readable tangible storage devices and program instructions stored on at least one of the one or more computer-readable tangible storage devices. The program instructions are executable: to execute, by a computer, a first first-stage training job to train a deep learning model; to finish, by the computer, the first first-stage training job, by using early stopping; to register, by the computer, a first second-stage training job to train a deep learning model that has been trained in the first first-stage training job, in response to the first first-stage training job being finished; to execute, by a computer, the first second-stage training job with a small number of epochs; to finish, by the computer, the small number of epochs in the first second-stage training job and to execute a second first-stage training job, in response to receiving a registration of the second first-stage training job; to finish, by the computer, the small number of epochs in the first second-stage training job and to execute a second second-stage training job that has a higher priority than the first second-stage, in response to receiving a registration of the second second-stage training job.

In yet another aspect, a computer system for efficient use of computing resources in two stage training of a deep learning model is provided. The computer system comprises one or more processors, one or more computer readable tangible storage devices, and program instructions stored on at least one of the one or more computer readable tangible storage devices for execution by at least one of the one or more processors. The program instructions are executable to execute, by a computer, a first first-stage training job to train a deep learning model. The program instructions are further executable to finish, by the computer, the first first-stage training job, by using early stopping. The program instructions are further executable to register, by the computer, a first second-stage training job to train a deep learning model that has been trained in the first first-stage training job, in response to the first first-stage training job being finished. The program instructions are further executable to execute, by a computer, the first second-stage training job with a small number of epochs. The program instructions are further executable to finish, by the computer, the small number of epochs in the first second-stage training job and to execute a second first-stage training job, in response to receiving a registration of the second first-stage training job. The program instructions are further executable to finish, by the computer, the small number of epochs in the first second-stage training job and to execute a second second-stage training job that has a higher priority than the first second-stage, in response to receiving a registration of the second second-stage training job.

DETAILED DESCRIPTION

Figure 1:
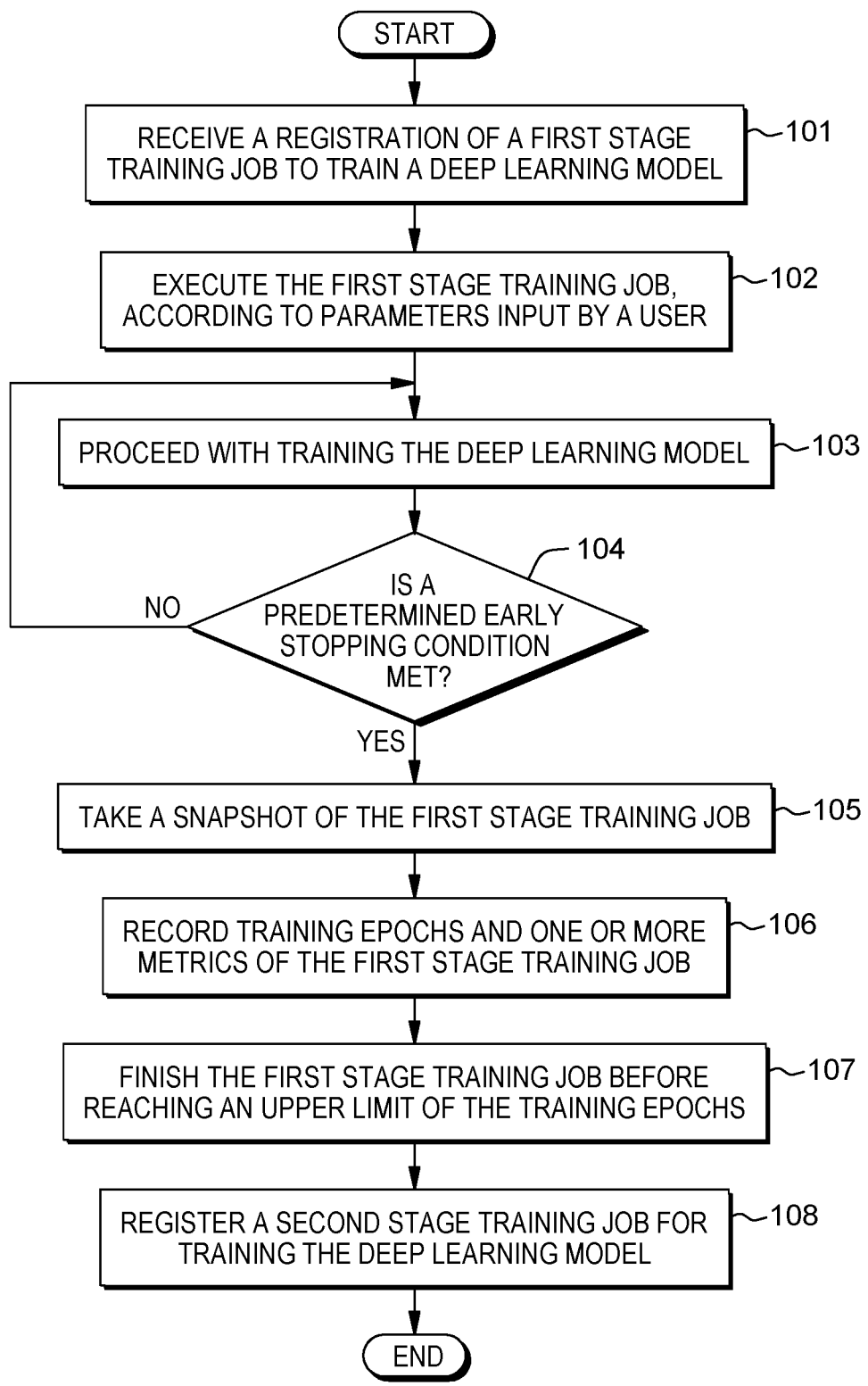
FIG. 1 is a flowchart showing operational steps of executing a training job in a first stage of training a deep leaning model, in accordance with one embodiment of the present invention.

Embodiments of the present invention present an approach to an efficient use of a computing resource to handle many requests of deep learning model training jobs and inference in parallel as much as possible. A training job can be stopped earlier and an evaluation of a deep learning model can be started in early timing before reaching a maximum limit of training iterations; therefore, the approach takes advantage of an early stopping method. The early stopped training job can be resumed automatically when a computing resource becomes available. A snapshot can be saved every time a best score of monitoring value (e.g., accuracy) is updated, and it is used for a next evaluation. This approach overcomes drawbacks of both the early stopping method and the checkpoint method, and furthermore the proposed approach efficiently utilizes computing resources.

In embodiments of the present invention, a new approach is introduced to control each training job of deep learning model training by dividing the training into two stages. The approach enables a user both to start an initial evaluation with short time and to obtain a best model at the end while using computing resources efficiently as much as possible. When a user has a model to be trained, the user registers the model to a scheduler as a training job with some input parameters, such as monitoring value (e.g., accuracy), a maximum (or upper) limit of training iterations, etc. The scheduler deploys training jobs to at least one computing resource, based on availability of at least one computing resource and priorities of training jobs.

In a case of a new training job, training a deep learning model is started from scratch and early stopped with saving a snapshot when a pre-defined early stopping condition is met. This is a first training stage. When finishing the training with early stopping, the scheduler records the number of epochs (or iterations) and metrics (e.g., accuracy). As soon as the new training (or first stage training job) job is finished, a user can start inference and an initial evaluation with the deep learning model.

In a case of a training job for a previously trained model in the first training stage, the scheduler reads the previously saved the number of epochs (or iterations) and metrics (e.g., accuracy), and then the scheduler resumes the training from the previous stop point. This is a second training stage. As far as at least one computing resource is available, the training continues to run one or more resumed training jobs (or one or more second stage training jobs). Each of the one or more resumed training jobs are with a small number of iterations (or epochs); therefore, the training process is with repeating re-starting, stopping, and saving snapshots after each of the one or more second stage training jobs is completed, until a maximum (or upper) limit of training epochs (or iterations) is reached. In addition, a user can change a priority of each of the one or more second stage training jobs, based on an initial evaluation result of the first stage training job or a previous second stage training job. For example, if an initially trained model has already exceeded a target accuracy, the user may set a lower priority for the one or more second stage training jobs. On the other hand, if an initially trained model has not reached a target accuracy, the user may set a higher priority for the one or more second stage training jobs.

If a new training job (or a first stage training job) is registered while a resumed training job (or a second stage training job) is running, the scheduler interrupts the resumed training job to run the new training job after a next snapshot of the resumed training job is taken.

In a case of two resumed training jobs (or second stage training jobs), if a higher priority is set for the second resumed training job which is waiting for a computing resource, the scheduler interrupts the first resumed training job which is running on the computing resource, and run the second resumed training job after a next snapshot of the first resumed training job is taken.

Under a situation where a second stage training job has a highest priority among second stage training jobs, a plurality of computing resources are available, and no first stage training job is executed on the computing resources, the second stage training job may be executed in parallel on more than one computing resource.

A user can check whether any snapshot is saved. When an observed metrics (e.g., accuracy) is better than a previously evaluated model, the user can perform a re-evaluation using the better model.

The scheduler is a computer program which is residing on a computer device. The computer device is described in more detail in later paragraphs with reference to FIG. 6. In some embodiments, the scheduler may reside on a virtual machine or another virtualization implementation. The virtual machine or the virtualization implementation runs on a computer device. In other embodiments, the scheduler may be implemented in a cloud computing environment. The cloud computing environment is described in later paragraphs with reference to FIG. 7 and FIG. 8.

FIG. 1 is flowchart showing operational steps of executing a first stage training job (or a new training job) in a first stage of training a deep leaning model, in accordance with one embodiment of the present invention. The operational steps are implemented by a computer device hosting the scheduler which is mentioned previously. At step 101, the computer device receives from a user a registration of the first stage training job to train a deep learning model. The user registers an execution program for training the deep learning model and execution parameters for the first stage training job. For example, the parameters may be values to be monitored and an upper limit of training iterations. An example of the values to be monitored may be precision. The user defines which metric is to be monitored and how often it is monitored, and the user defines the patience number of epochs.

At step 102, the computing device executes the first stage training job, according to the parameters input by the user. At step 103, the computer device proceeds with training the deep learning model. After one or more iterations (or epochs) of training the deep learning model, the computer device determines, at step 104, whether a predetermined early stopping condition is met. The execution program monitors the metrics (e.g., precision or loss) of every specified epochs.

In response to determining the predetermined early stopping condition being not met (NO branch of step 104), the computer device iterates step 103.

In response to determining the predetermined early stopping condition being met (YES branch of step 104) (in other words, in response to determining improvement of training the model having not been observed), at step 105, the computer device takes a snapshot of the first stage training job.

At step 106, the computer device records how many training epochs have been executed and records one or more metrics of the first stage training job. The one or more metrics may include a value of precision in the training. At step 107, the computer device finishes the first stage training job before reaching an upper limit of the training epochs. Upon finishing the first stage training job, at step 108, the computer device registers a second stage training job for training a deep learning model that has been trained in the first stage training job.

Figure 2:
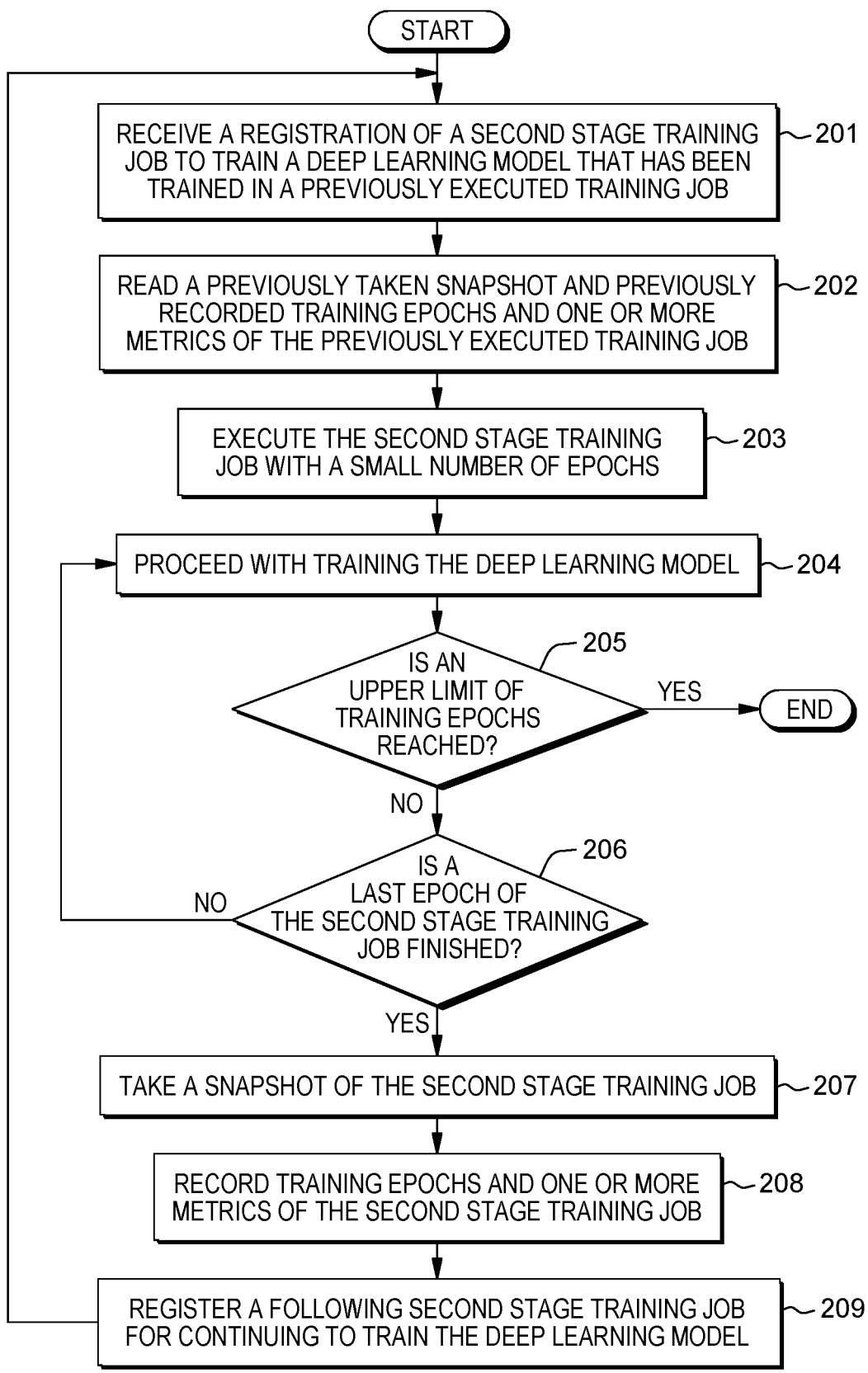
FIG. 2 is a flowchart showing operational steps of executing a training job in a second stage of training a deep leaning model, in accordance with one embodiment of the present invention.

FIG. 2 is a flowchart showing operational steps of executing a second stage training job (or the training job for a previously trained model, or the job registered at step 108 in FIG. 1) in a second stage of training a deep leaning model, in accordance with one embodiment of the present invention. The operational steps are implemented by a computer device hosting the scheduler which is mentioned previously. At step 201, the computer device receives a registration of the second stage training job to train a deep learning model that has been trained in a previously executed training job (either a first stage training job or a previously executed second stage job). Execution of the first stage training job has been described in previous paragraphs with reference to FIG. 1.

At step 202, the computer device reads a previously taken snapshot and previously recorded training epochs and one or more metrics of the previously executed training job. The previously taken snapshot has been taken (e.g., at step 105 in FIG. 1 for the first stage training job), and the previously recorded training epochs and one or more metrics of a previously executed training job have been recorded (e.g., at step 106 in FIG. 1 for the first stage training job).

At step 203, the computer device executes the second stage training job with a small number of epochs. The number of epochs in the second stage training job is smaller than that in the first stage training job; for example, the number of epochs of the first stage training job is 85 while the number of epochs of the second stage training job is 5. The small number of epochs in the second stage training job allows the scheduler to interrupt the second stage training job and makes a computing resource available as soon as possible for a newly registered first stage training job (which has a higher priority) or a newly registered second stage training job with a higher priority. If the second stage training job runs with a great number of iterations (or epochs), the scheduler does not have a chance to interrupt the second stage training job, and the newly registered first stage training job or the newly registered second stage training job with a higher priority must wait for a long time for the computing resource becoming available.

At step 204, the computer device proceeds with training the deep learning model. At step 205, the computer device determines whether an upper limit of training epochs is reached. In response to determining the upper limit of training epochs being reached (YES branch of step 205), the computer device finishes the second stage training job.

In response to determining the upper limit of training epochs being not reached (NO branch of step 205), the computer device, at step 206, determines whether a last epoch (or a final epoch, e.g., the 5th epoch if the number of epochs is 5) of the second stage training job is finished. In response to determining the last epoch of the second stage training job being not finished (NO branch of step 206), the computer device executes a next epoch, reiterating step 204.

In response to determining the last epoch of the second stage training job being finished (YES branch of step 206), at step 207, the computer device takes a snapshot of the second stage training job. At step 208, the computer device records the number of training epochs and one or more metrics of the second stage training job. The one or more metrics may include a value of precision in the training.

At step 209, the computer device registers a following second stage training job for continuing to train the same deep learning model (in order words, training a deep learning model that has been trained by the second stage training job). If no newly registered first stage training job or the newly registered second stage training job with a higher priority is registered and waiting for the training, the computer device executes the following second stage training job by running steps 201-209. However, if a first stage training job is newly registered and waiting for the training, the computer device delays the execution of the following second stage job, because the first stage training job always has a higher priority than any second stage training job; similarly, if another second stage training job with a higher priority than the following second stage job is registered and waiting for the training, the computer device delays the following second stage job because of the lower priority of the following second stage training job.

Figure 3:
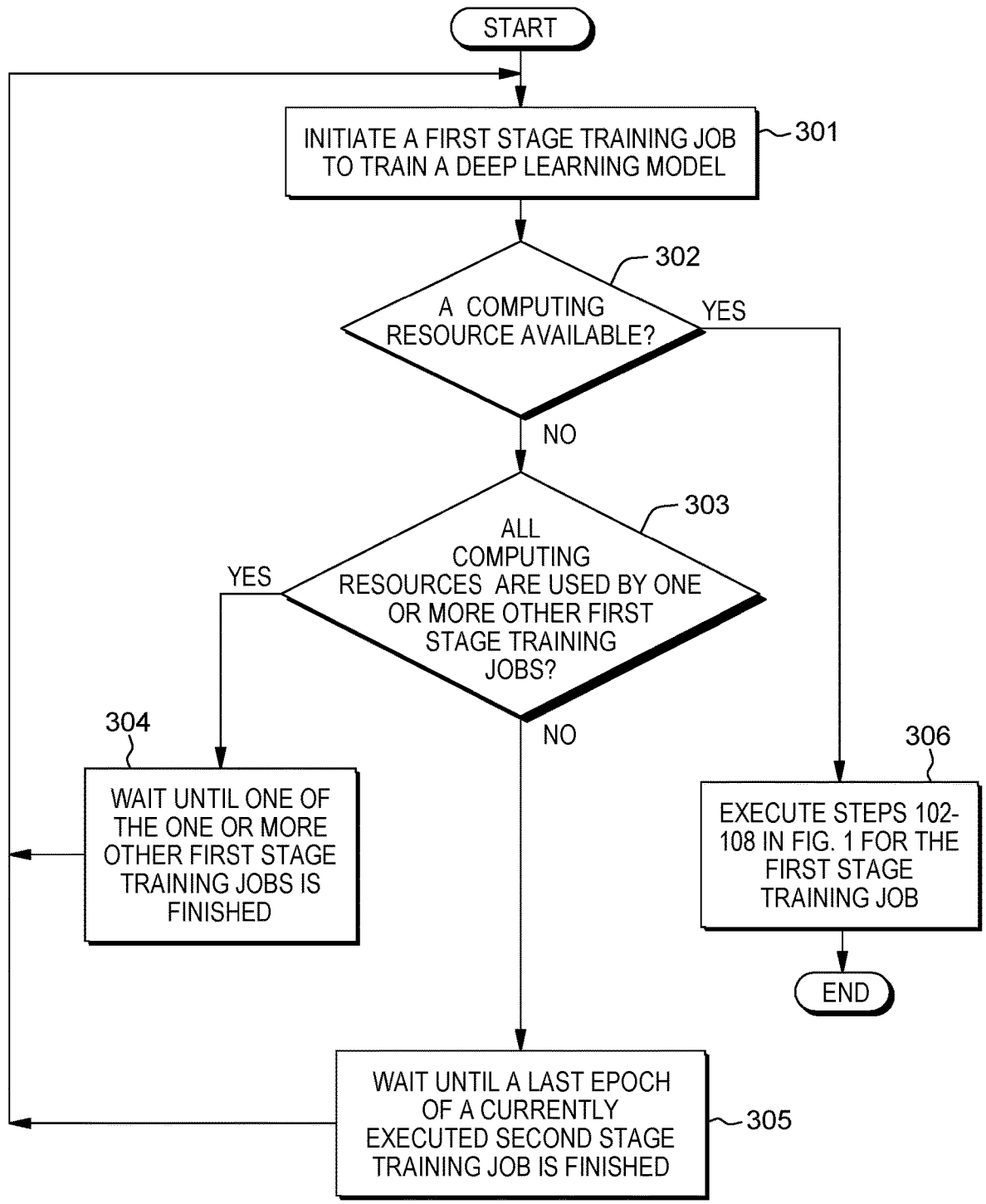
FIG. 3 is a flowchart showing operational steps of scheduling a first stage training job to achieve efficient use of computing resources, in accordance with one embodiment of the present invention.

FIG. 3 is a flowchart showing operational steps of scheduling a first stage training job to achieve efficient use of computing resources, in accordance with one embodiment of the present invention. The operational steps are implemented by a computer device hosting the scheduler which is mentioned previously.

At step 301, the computer device initiates the first stage training job to train a deep learning model. At step 302, the computer device determines whether a computing resource is available for training the deep learning model.

In response to determining computing resource being available (YES branch of step 302), as shown in block 306, the computer device executes steps 102-108 in FIG. 1 for the first stage training job.

In response to determining computing resource being not available (NO branch of step 302), at step 303, the computer device determines whether all computing resources are used by one or more other first stage training jobs.

In response to determining all computing resources being used by the one or more other first stage training jobs (YES branch of step 303), the computer device at step 304 delays the first stage training job until one of the one or more other first stage training jobs is finished. Once any of the one or more other first stage training jobs is finished, the computer device executes steps 102-108 (which are shown in FIG. 1) for the first stage training job.

If not all computing resources are used by the one or more other first stage training jobs, at least one second stage training job (which trains a different deep learning model) is executed. The at least one second stage training job has a lower priority than the first stage training job; therefore, in response to determining not all computing resources being used by the one or more other first stage training jobs (NO branch of step 303), the computer device at step 305 interrupts a currently executed second stage training job and makes a computing resource used by the currently executed second stage training job available for the first stage training job. The computer device delays the first stage training job until a last epoch (or a final epoch, e.g., the 5th epoch if the number of epochs is 5) of the currently executed second stage training job is finished. The computer device executes steps 204-209 until the last epoch of a currently executed second stage training job is finished and then the computer device executes the first stage training job. At step 305, while the first stage training job waits until the last epoch of a currently executed second stage training job is finished, one of the one or more other first stage training jobs may be finished before the last epoch is reached; under such a situation, the computer device starts to execute the first stage training job, using the available computing resource which has just been vacated by the one of the one or more other first stage training jobs.

Figure 4:
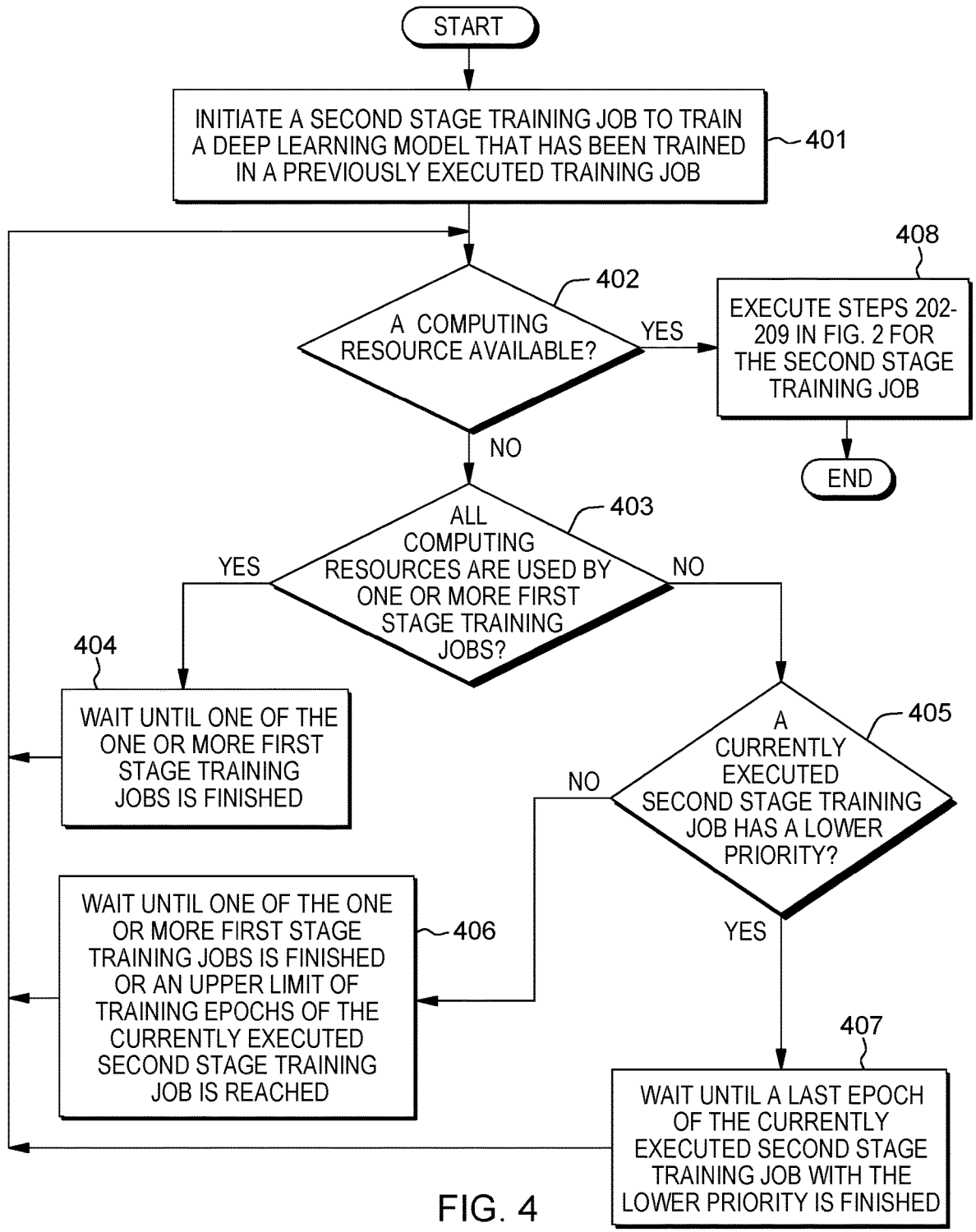
FIG. 4 is a flowchart showing operational steps of scheduling a second stage training job to achieve efficient use of computing resources, in accordance with one embodiment of the present invention.

FIG. 4 is a flowchart showing operational steps of scheduling a second stage training job to achieve efficient use of computing resources, in accordance with one embodiment of the present invention. The operational steps are implemented by a computer device hosting the scheduler which is mentioned previously.

At step 401, the computer device initiates the second stage training job to train a deep learning model that has been trained in a previously executed training job. At step 402, the computer device determines whether a computing resource is available for training the deep learning model.

In response to determining computing resource being available (YES branch of step 402), as shown in block 408, the computer device executes steps 202-209 in FIG. 2 for the second stage training job.

In response to determining computing resource being not available (NO branch of step 402), at step 403, the computer device determines whether all computing resources are used by one or more first stage training jobs.

In response to determining all computing resources being used by the one or more first stage training jobs (YES branch of step 403), the computer device at step 404 delays the second stage training job. Thus, the second stage training job waits until one of the one or more first stage training jobs is finished. Once any of the one or more first stage training jobs is finished, the computer device executes steps 202-209 (which are shown in FIG. 2) for the second stage training job. Since the one or more first stage training jobs have higher priorities than the second stage training job, the computer device does not interrupt the one or more first stage training jobs.

If not all computing resources are used by the one or more first stage training jobs, at least one second stage training job (which trains a different deep learning training model) is executed. In response to determining not all computing resources being used by the one or more first stage training jobs (NO branch of step 403), the computer device at step 405 determines whether a currently executed second stage training job (which trains a different deep learning training model) has a lower priority than the second stage training job in the waiting queue.

In response to determining the currently executed second stage training job having the lower priority (YES branch of step 405), the computer device at step 407 interrupts the currently executed second stage training job and makes a computing resource used by the currently executed second stage training job available for the second stage training job in the waiting queue. The computer device delays the second stage training job in the queue until a last epoch (or a final epoch, e.g., the 5th epoch if the number of epochs is 5) of the currently executed second stage training job with the lower priority is finished. The computer device first executes steps 204-209 in FIG. 2 until the last epoch of the currently executed second stage training job with the lower priority is finished, and then executes the second stage training job in the awaiting queue. At step 407, while the second stage training job waits until the last epoch of the currently executed second stage training job is finished, one of the one or more first stage training jobs may be finished or another currently executed second stage training job with a higher priority reaches an upper limit of epochs before the last epoch is reached; under such a situation, the computer device starts to execute the second stage training job, using the available computing resource which has just been vacated by the one of the one or more first stage training jobs or another currently executed second stage training job with the higher priority.

In response to determining the currently executed second stage training job not having the lower priority (NO branch of step 405), the computer device delays at step 406 the second stage training job in the queue until the computing resource becomes available; in other words, the computer device delays the second stage training job until one of following conditions is met: one of the one or more first stage training jobs is finished, an upper limit of training epochs of the currently executed second stage job is reached. The computer device executes steps 201-209 in FIG. 2 for the currently executed second stage training job until the YES branch of step 205 is reached, unless an incoming first stage job or an incoming second stage job with higher priority is in the waiting queue. In other words, the execution of the currently executed second stage training job will not be interrupted. However, if a user meanwhile decreases the priority of the currently executed second stage job (the priority of the currently executed second stage job becomes lower than that of the second stage training job in the awaiting queue), the computer device interrupts the currently executed second stage training job at next scheduling timing; similarly, if a user meanwhile increases the priority of the second stage training job in the awaiting queue (the priority of the second stage training job in the awaiting queue becomes higher than that of the currently executed second stage job), the computer device interrupts the currently executed second stage training job at next scheduling timing.

Figure 5:
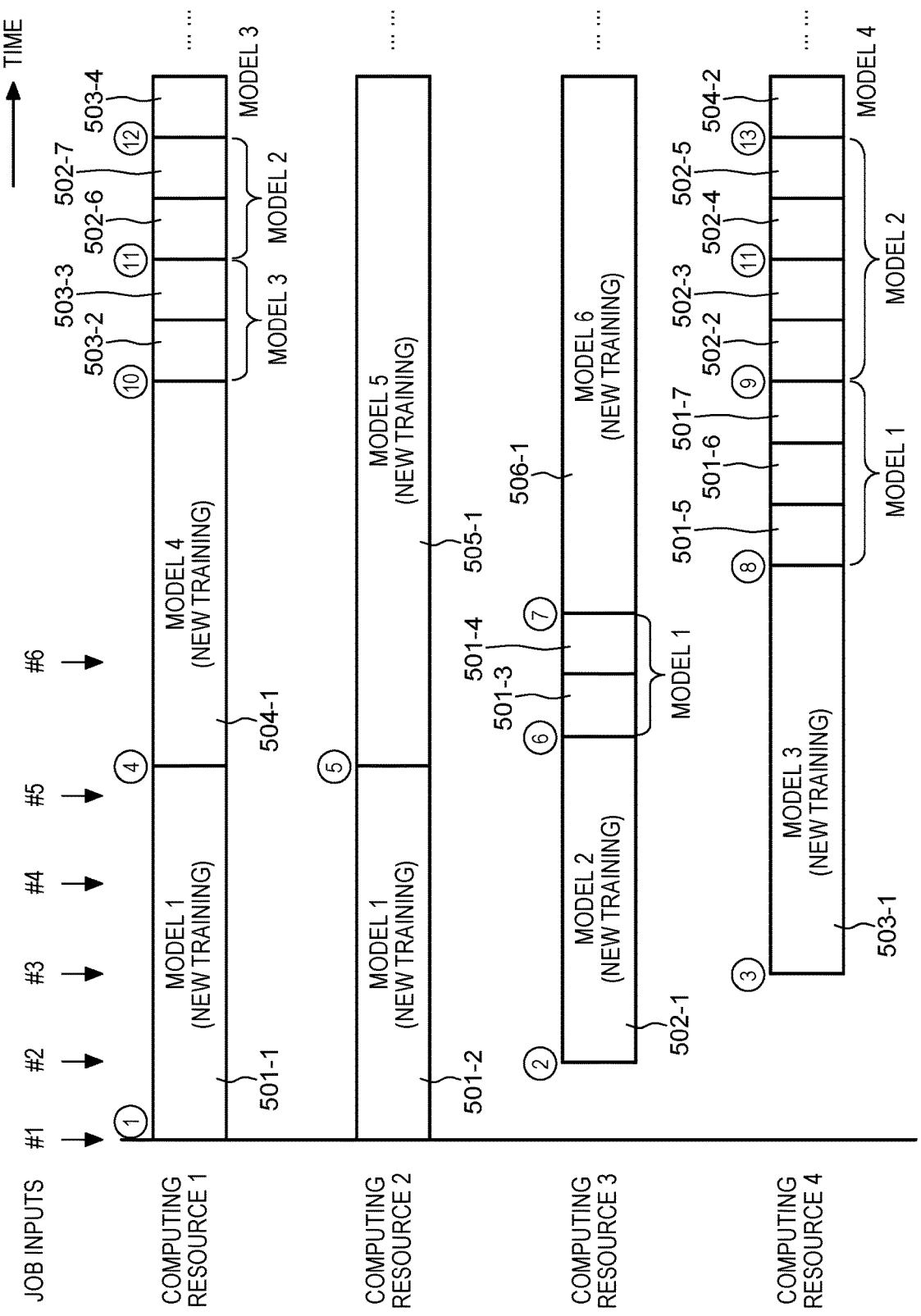
FIG. 5 is a diagram showing an example of scheduling training jobs to achieve efficient use of computing resources, in accordance with one embodiment of the present invention.

FIG. 5 is a diagram showing an example of scheduling training jobs to achieve efficient use of computing resources, in accordance with one embodiment of the present invention. Scheduling training jobs is implemented by a computer device hosting the scheduler which is mentioned previously.

Referring to FIG. 5, four computing resources are available for training deep learning models, namely computing resource 1, computing resource 2, computing resource 3, and computing resource 4. Job input #1 is for training model 1, job input #2 is for training model 2, job input #3 is for training model 3, job input #4 is for training model 4, job input #5 is for training model 5, and job input #6 is for training model 6. Job input #1 through job input #6 are registered at different time.

Referring to FIG. 5, at time ①, the computer device starts to execute job input #1 as a new training job (or first stage training job) for training model 1 by using computing resources 1 and 2 in parallel, as indicated by numerals 501-1 and 501-2. Two computing resources are used for parallel executions of job input #1.

At time ②, the computer device starts to execute job input #2 as a new training job (or first stage training job) for training model 2 by using computing resource 3 which is available, as indicated by numeral 502-1.

At time ③, the computer device starts to execute job input #3 as a new training job (or first stage training job) for training model 3 by using computing resource 4 which is available, as indicated by numeral 503-1.

At time ④, the computer device completes the execution of job input #1 (a first stage training job) on computing resource 1, and therefore computing resource 1 becomes available. Thus, the computer device starts to execute job input #4 as a new training job (or first stage training job) for training model 4 by using computing resource 1 which is now available, as indicated by numeral 504-1.

At time ⑤, the computer device completes the execution of job input #1 (a first stage training job) on computing resource 2, and therefore computing resource 2 becomes available. Thus, the computer device starts to execute job input #5 as a new training job (or first stage training job) for training model 5 by using computing resource 2 which is now available, as indicated by numeral 505-1. After the execution of job input #1 is completed, model 1 is ready for a user to start an evaluation.

At time ⑥, the computer device completes the execution of job input #2 (a first stage training job) on computing resource 3. After job input #2 is completed, model 2 is ready for a user to start an evaluation. Now, no new training job (first stage training job) or a second stage training job with a higher priority is waiting for computing resource 3 which is available. Therefore, on commuting resource 3, the computer device starts to execute a second stage training job for continuing to train model 1, as indicated by numeral 501-3. The second stage training job indicated by numeral 501-3 is executed with a small number of epochs, which is smaller than a number of epochs of the new training job or first stage training job. For example, the computer device executes 85 epochs for a first stage training job and only 5 epochs for a second stage training job (unless an upper limit of training epochs is reached.

Referring to FIG. 5, after the small number of epochs, the computer device completes the second stage training job indicated by numeral 501-3. So far, still no new training job (or first stage training job) or a second stage training job with a higher priority is waiting for computing resource 3; thus, the computer device executes a following second stage training job (indicated by numeral 501-4) for continuing to train model 1.

After starting the training job indicated by numeral 501-4, the computer device receives a registration of a new job or a first stage training job—job input #6 for training model 6. Since any first stage training job has a higher priority than any second stage training job, the training job indicated by numeral 501-4 will be interrupted by the computer device. The computer device lets job input #6 wait until the small number of epochs (e.g., 5 epochs) of the training job indicated by numeral 501-4 are completed. After completing the training job indicated by numeral 501-4, at time ⑦, the computer device starts to execute job input #6 as a new training job (or first stage training job) by using computing resource 3 which is available, as indicated by numeral 506-1.

At time ⑧, the computer device completes the execution of job input #3 (a first stage training job) on computing resource 4. After job input #3 is completed, model 3 is ready for a user to start an evaluation. Now, computing resource 4 is available. No new training job (or first stage training job) or a second stage training job with a higher priority is waiting for computing resource 4. The computer device starts to execute several following second stage training jobs (indicated by numerals 501-5, 501-6, and 501-7) for continuing to train model 1, by using computing resource 4. Each of the following second stage training jobs is executed with a small number of epochs (e.g., 5 epochs). At time 0, an upper limit of training model 1 is reached; thus, the computer device ends the following second stage training job indicated by numeral 501-7 and completes training model 1. Now, computing resource 4 becomes available.

At time ⑨, no new training job (or first stage training job) and the second stage training jobs for training model 2 has a highest priority among all other second stage training jobs. Therefore, the computer device starts to execute second stage training jobs for training model 2, as indicated by numerals 502-2 and 502-3. Each of the second stage training jobs 502-2 and 502-3 is executed with a small number of epochs (e.g., 5 epochs).

At time ⑩, the computer device complete the execution of job input #4 (a first stage training job indicated by numeral 504-1) on computing resource 1. Now, computing resource 1 is available. No new training job (or first stage training job) and the second stage training jobs for continuing to train model 3 has a highest priority among all second stage training jobs waiting for computing resources; therefore, the computer device starts to execute the second stage training jobs for training model 3, as indicated by numerals 503-2 and 503-3. Each of the second stage training jobs indicated by numerals 503-2 and 503-3 is executed with a small number of epochs (e.g., 5 epochs).

At time ⑪, the computer device receives from a user a request to raise a priority of job input #2 (for example, from priority 5/10 to 7/10). The computer device finishes the execution of the second stage training job indicated by numeral 503-3 on computing resource 1 (because of a lower priority of the second stage training job), after completing a last epoch (or a final epoch, e.g., the 5th epoch if the number of epochs is 5) of the second stage training job indicated by numeral 503-3. Then, the computer device starts to execute second stage training jobs for training model 2 on computing resource 1 (as indicated by numerals 502-6 and 502-7) and on computing resource 4 (as indicated by numeral 502-4 and 502-5) in parallel.

At time ⑫, on computing resource 1, the computer device completes the execution of the second stage training jobs indicated by numerals 502-6 and 502-7. Now, computing resource 1 is available. The second stage training jobs for training model 3 has a highest priority now; thus, on computing resource 1, the computer device starts to execute the second stage training jobs for training model 3, as indicated by numeral 503-4. The second stage training jobs indicated by numeral 503-4 is executed with a small number of epochs (e.g., 5 epochs).

At time ⑬, on computer resource 4, the computer device completes the execution of second stage training jobs indicated by numerals 502-4 and 502-5, because an upper limit of training model 2 is reached. Now, computing resource 4 is available. The second stage training jobs for training model 4 have a highest priority now; thus, on computing resource 4, the computer device starts to execute the second stage training jobs for training model 4, as indicated by numeral 504-2.

Figure 6:
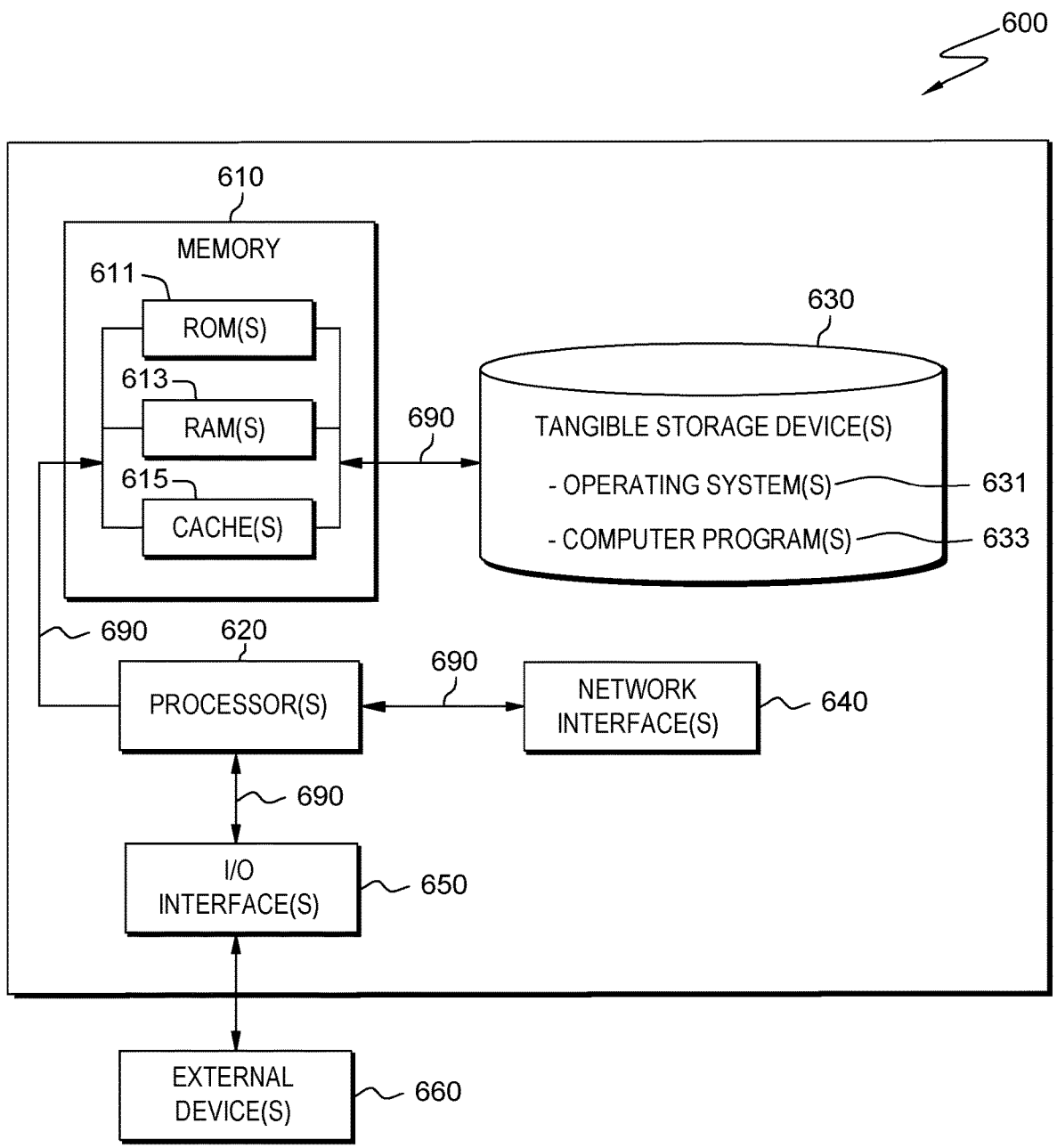
FIG. 6 is a diagram illustrating components of a computer device, in accordance with one embodiment of the present invention.

FIG. 6 is a diagram illustrating components of computer device 600, in accordance with one embodiment of the present invention. It should be appreciated that FIG. 6 provides only an illustration of one implementation and does not imply any limitations with regard to the environment in which different embodiments may be implemented.

Referring to FIG. 6, computer device 600 includes processor(s) 620, memory 610, and tangible storage device(s) 630. In FIG. 6, communications among the above-mentioned components of computer device 600 are denoted by numeral 690. Memory 610 includes ROM(s) (Read Only Memory) 611, RAM(s) (Random Access Memory) 613, and cache(s) 615. One or more operating systems 631 and one or more computer programs 633 reside on one or more computer readable tangible storage device(s) 630.

Computer device 600 further includes I/O interface(s) 650. I/O interface(s) 650 allows for input and output of data with external device(s) 660 that may be connected to computer device 600. Computer device 600 further includes network interface(s) 640 for communications between computer device 600 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the C programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
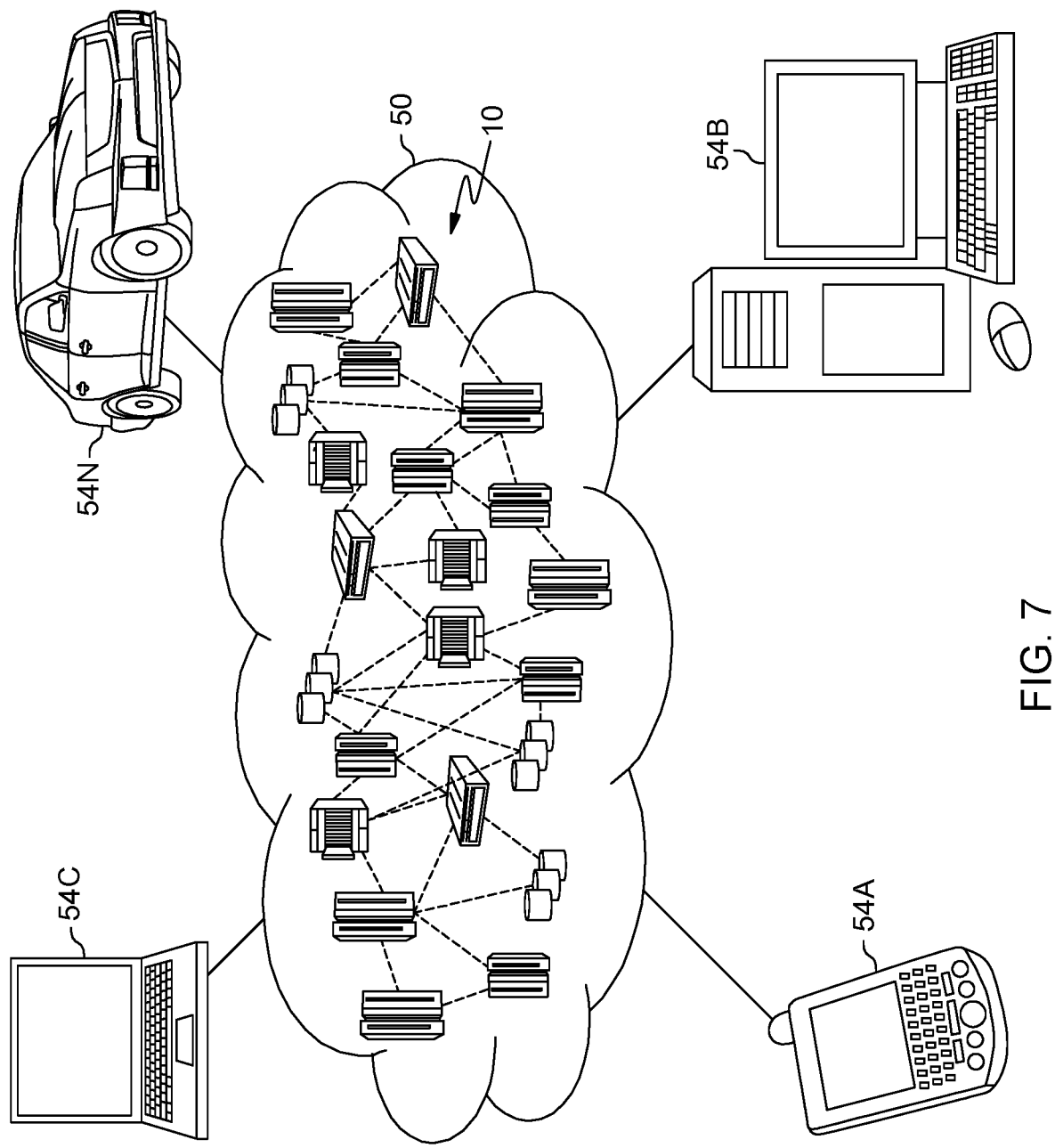
FIG. 7 depicts a cloud computing environment, in accordance with one embodiment of the present invention.

Referring now to FIG. 7, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 8:
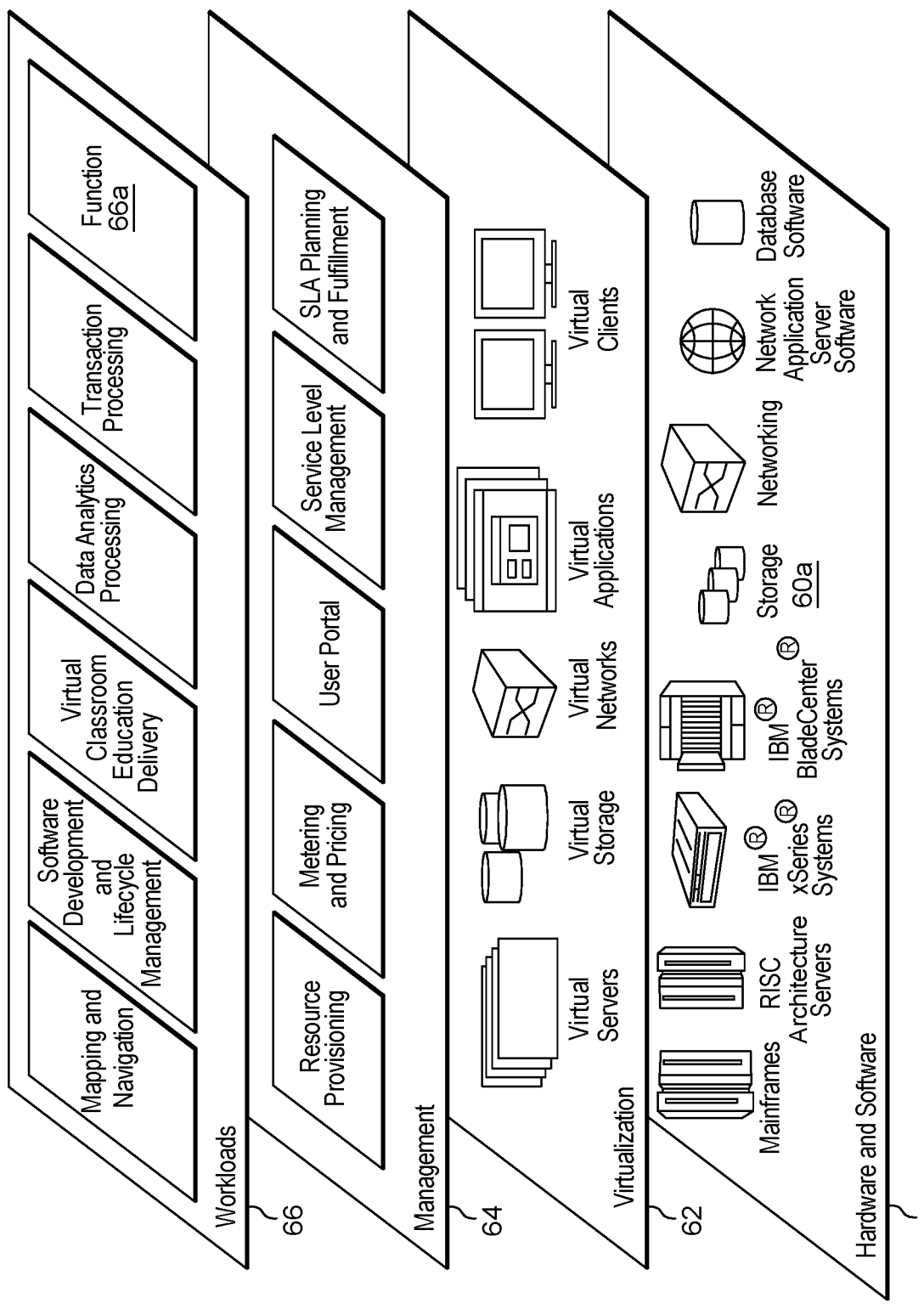
FIG. 8 depicts abstraction model layers in a cloud computing environment, in accordance with one embodiment of the present invention.

Referring now to FIG. 8, a set of functional abstraction layers provided by cloud computing environment 50 (shown FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes, RISC (Reduced Instruction Set Computer) architecture based servers, servers, blade servers, storage devices, and networks and networking components. In some embodiments, software components include network application server software and database software.

Virtualization layer 62 provides an abstraction layer from which the following examples of virtual entities may be provided: virtual servers, virtual storage, virtual networks, including virtual private networks, virtual applications and operating systems, and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User Portal provides access to the cloud computing environment for consumers and system administrators. Service Level Management provides cloud computing resource allocation and management such that required service levels are met. Service Level Agreement (SLA) Planning and Fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: Mapping and Navigation, Software Development and Lifecycle Management, Virtual Classroom Education Delivery, Data Analytics Processing, Transaction Processing, and functionality according to the present invention (Function 66a). In embodiments of the present invention, function 66a is scheduling training jobs for training deep learning models.

What is claimed is:

1. A computer-implemented method for efficient use of computing resources in two stage training of multiple training jobs to train deep learning models, the method comprising:
   executing, by a computer, a first stage of a first training job to train a first deep learning model;
   finishing, by the computer, the first stage of the first training job, in response to determining a predetermined condition of early stopping being met;
   in response to the first stage of the first training job being finished by using the early stopping:
      taking, by the computer, a snapshot of the first stage of the first training job;
      recording, by the computer, a number of training epochs and one or more metrics of the first stage of the first training job; and
      registering, by the computer, a second stage of the first training job, wherein the second stage of the first training job trains the first deep learning model after early stopping of the first stage of the first training job, wherein the second stage of the first training job is scheduled to resume from the last epoch of where the first stage of the first training job was stopped;
   executing, by the computer, the second stage of the first training job with a small number of epochs;
   in response to receiving, while executing the second stage of the first training job, a registration of a first stage of a second training job to train a second deep learning model:
      finishing, by the computer, the small number of epochs in the second stage of the first training job;
      recording, by the computer, a total number of training epochs reached from the execution of first stage and the second stage of the first training job, and one or more metrics of the second stage of the first training job;
      obtaining an accuracy of the second stage of the first training job using the metrics of the second stage of the first training job; and
      executing the first stage of the second training job;
   in response to receiving, while executing the second stage of the first training job, a registration of a second stage of the second training job, wherein the second stage of the second training job trains the second deep learning job after early stopping of the first stage of the second training job and has a higher priority than the second stage of the first training job, wherein the priority of the second stage of the second training job is determined based on a comparison between an accuracy obtained from metrics recorded from the second stage of the second training job and the accuracy obtained from the second stage of the first training job; and
   finishing, by the computer, the small number of epochs in the second stage of the first training job and executing the second stage of the second training job.

2. The computer-implemented method of claim 1, finishing the small number of epochs in the second stage of the first training job further comprising:
   determining, by the computer, whether a final epoch of the second stage of the first training job is finished;
   in response to determining the final epoch of the second stage of the first training job being finished, taking, by the computer, a snapshot of the second stage of the first training job;
   recording, by the computer, training epochs and one or more metrics of the second stage of the first training job; and
   registering, by the computer, a further second stage of the first training job that follows the second stage of the first training job, wherein the further second stage of the first training job trains the first deep learning model that has been trained in the second stage of the first training job.

3. The computer-implemented method of claim 2, further comprising:
- determining, by the computer, whether an upper limit of the training epochs is reached;
- in response to determining the upper limit of the training epochs being reached, stopping, by the computer, the second stage of the first training job; and
- in response to determining the upper limit of the training epochs being not reached, executing, by the computer, a next epoch of the second stage of the first training job.

4. The computer-implemented method of claim 1, further comprising:
- determining, by the computer, whether a computing resource is available;
- in response to determining the computing resource being available, proceeding, by the computer, with execution of the first stage of the first training job;
- in response to determining the computing resource being not available, determining, by the computer, whether all computing resources are used by one or more other first stage training jobs;
- in response to determining the all computing resources being used by the one or more other first stage training jobs, delaying, by the computer, the first stage of the first training job until one of the one or more other first stage training jobs is finished;
- in response to determining not all computing resources being used by the one or more other first stage training jobs, delaying, by the computer, the first stage of the first training job until a final epoch of a currently executed second stage training job is finished.

5. The computer-implemented method of claim 1, further comprising:
- determining, by the computer, whether a computing resource is available;
- in response to determining the computing resource being available, proceeding, by the computer, with execution of the second stage of the first training job;
- in response to determining the computing resource being not available, determining, by the computer, whether all computing resources are used by one or more first stage training jobs;
- in response to determining the all computing resources being used by the one or more first stage training jobs, delaying, by the computer, the second stage of the first training job until one of the one or more first stage training jobs is finished;
- in response to determining not all computing resources being used by the one or more first stage training jobs, determining, by the computer, whether a currently executed second stage training job has a lower priority than the second stage of the first training job;
- in response to determining the currently executed second stage training job having the lower priority, delaying, by the computer, the second stage of the first training job until a final epoch of the currently executed second stage training job is finished; and
- in response to determining the currently executed second stage training job not having the lower priority, delaying, by the computer, the second stage of the first training job until one of following conditions is met: one of the one or more other first stage training jobs is finished and an upper limit of training epochs of the currently executed second stage training job is reached.

6. The computer-implemented method of claim 1, further comprising:
- in response to determining the second stage of the first training job having a highest priority among second stage training jobs, a plurality of computing resources being available, and no first stage training job being executed on the computing resources, executing, by the computer, the first second-stage training job in parallel on more than one computing resource.

7. A computer program product for efficient use of computing resources in two stage training of multiple training jobs to train deep learning models, the computer program product comprising one or more computer-readable tangible storage devices and program instructions stored on at least one of the one or more computer-readable tangible storage devices, the program instructions executable to:
- execute, by a computer, a first stage of a first training job to train a first deep learning model;
- finish, by the computer, the first stage of the first training job, in response to determining a predetermined condition of early stopping being met;
- in response to the first stage of the first training job being finished by using the early stopping:
  - take, by the computer, a snapshot of the first stage of the first training job;
  - record, by the computer, a number of training epochs and one or more metrics of the first stage of the first training job; and
  - register, by the computer, a second stage of the first training job, wherein the second stage of the first training job trains the first deep learning model after early stopping of the first stage of the first training job wherein the second stage of the first training job is scheduled to resume from the last epoch of where the first stage of the first training job was stopped;
- execute, by the computer, the second stage of the first training job with a small number of epochs;
- in response to receiving, while executing the second stage of the first training job, a registration of a first stage of a second training job to train a second deep learning model:
  - finish, by the computer, the small number of epochs in the second stage of the first training job
  - record, by the computer, a total number of training epochs reached from the execution of first stage and the second stage of the first training job, and one or more metrics of the second stage of the first training job;
- obtain an accuracy of the second stage of the first training job using the metrics of the second stage of the first training job; and
- execute the first stage of the second training job;
- in response to receiving, while executing the second stage of the first training job, a registration of a second stage of the second training job, wherein the second stage of the second training job trains the second deep learning job after early stopping of the first stage of the second training job and has a higher priority than the second stage of the first training job, wherein the priority of the second stage of the second training job is determined based on a comparison between an accuracy obtained from metrics recorded from the second stage of the second training job and the accuracy obtained from the second stage of the first training job; and
- finish, by the computer, the small number of epochs in the second stage of the first training job and executing the second stage of the second training job.

8. The computer program product of claim 7, further comprising the program instructions executable to:
- determine, by the computer, whether a final epoch of the second stage of the first training job is finished;
- in response to determining the final epoch of the second stage of the first training job being finished, take, by the computer, a snapshot of the second stage of the first training job;
- record, by the computer, training epochs and one or more metrics of the second stage of the first training job; and
- register, by the computer, a further second stage of the first training job that follows the second stage of the first training job, wherein the further second stage of the first training job trains the first deep learning model that has been trained in the second stage of the first training job.

9. The computer program product of claim 8, further comprising the program instructions executable to:
- determine, by the computer, whether an upper limit of the training epochs is reached;
- in response to determining the upper limit of the training epochs being reached, stop, by the computer, the second stage of the first training job; and
- in response to determining the upper limit of the training epochs being not reached, execute, by the computer, a next epoch of the second stage of the first training job.

10. The computer program product of claim 7, further comprising the program instructions executable to:
- determine, by the computer, whether a computing resource is available;
- in response to determining the computing resource being available, proceed, by the computer, with execution of the first stage of the first training job;
- in response to determining the computing resource being not available, determine, by the computer, whether all computing resources are used by one or more other first stage training jobs;
- in response to determining the all computing resources being used by the one or more other first stage training jobs, delay, by the computer, the first stage of the first training job until one of the one or more other first stage training jobs is finished;
- in response to determining not all computing resources being used by the one or more other first stage training jobs, delay, by the computer, the first stage of the first training job until a final epoch of a currently executed second stage training job is finished.

11. The computer program product of claim 7, further comprising the program instructions executable to:
- determine, by the computer, whether a computing resource is available;
- in response to determining the computing resource being available, proceed, by the computer, with execution of the second stage of the first training job;
- in response to determining the computing resource being not available, determine, by the computer, whether all computing resources are used by one or more first stage training jobs;
- in response to determining the all computing resources being used by the one or more first stage training jobs, delay, by the computer, the second stage of the first training job until one of the one or more first stage training jobs is finished;
- in response to determining not all computing resources being used by the one or more first stage training jobs, determine, by the computer, whether a currently executed second stage training job has a lower priority than the second stage of the first training job;
- in response to determining the currently executed second stage training job having the lower priority, delay, by the computer, the second stage of the first training job until a final epoch of the currently executed second stage training job is finished; and
- in response to determining the currently executed second stage training job not having the lower priority, delay, by the computer, the second stage of the first training job until one of following conditions is met: one of the one or more other first stage training jobs is finished and an upper limit of training epochs of the currently executed second stage training job is reached.

12. The computer program product of claim 7, further comprising the program instructions executable to:
- in response to determining the second stage of the first training job having a highest priority among second stage training jobs, a plurality of computing resources being available, and no first stage training job being executed on the computing resources, execute, by the computer, the first second-stage training job in parallel on more than one computing resource.

13. A computer system for efficient use of computing resources in two stage training of multiple training jobs to train deep learning models, the computer system comprising:
- one or more processors, one or more computer readable tangible storage devices, and program instructions stored on at least one of the one or more computer readable tangible storage devices for execution by at least one of the one or more processors, the program instructions executable to:
- execute, by a computer, a first stage of a first training job to train a first deep learning model;
- finish, by the computer, the first stage of the first training job, in response to determining a predetermined condition of early stopping being met;
- in response to the first stage of the first training job being finished by using the early stopping"
- take, by the computer, a snapshot of the first stage of the first training job;
- record, by the computer, a number of training epochs and one or more metrics of the first stage of the first training job; and
- register, by the computer, a second stage of the first training job, wherein the second stage of the first training job trains the first deep learning model after early stopping of the first stage of the first training job, wherein the second stage of the first training job is scheduled to resume from the last epoch of where the first stage of the first training job was stopped;
- execute, by the computer, the second stage of the first training job with a small number of epochs;
- in response to receiving, while executing the second stage of the first training job, a registration of a first stage of a second training job to train a second deep learning model;
- finish, by the computer, the small number of epochs in the second stage of the first training job;
- record by the computer, a total number of training epochs reached from the execution of first stage and the second stage of the first training job, and one or more metrics of the second stage of the first training job;

obtain an accuracy of the second stage of the first training job using the metrics of the second stage of the first training job; and execute the first stage of the second training job;

in response to receiving, while executing the second stage of the first training job, a registration of a second stage of the second training job, wherein the second stage of the second training job trains the second deep learning job after early stopping of the first stage of the second training job and has a higher priority than the second stage of the first training job, wherein the priority of the second stage of the second training job is determined based on a comparison between an accuracy obtained from metrics recorded from the second stage of the second training job and the accuracy obtained from the second stage of the first training job; and finish, by the computer, the small number of epochs in the second stage of the first training job and executing the second stage of the second training job.

14. The computer system of claim 13, further comprising the program instructions executable to:

determine, by the computer, whether a final epoch of the second stage of the first training job is finished;

in response to determining the final epoch of the second stage of the first training job being finished, take, by the computer, a snapshot of the second stage of the first training job;

record, by the computer, training epochs and one or more metrics of the second stage of the first training job; and register, by the computer, a further second stage of the first training job that follows the second stage of the first training job, wherein the further second stage of the first training job trains the first deep learning model that has been trained in the second stage of the first training job.

15. The computer system of claim 14, further comprising the program instructions executable to:

determine, by the computer, whether an upper limit of the training epochs is reached;

in response to determining the upper limit of the training epochs being reached, stop, by the computer, the second stage of the first training job; and in response to determining the upper limit of the training epochs being not reached, execute, by the computer, a next epoch of the second stage of the first training job.

16. The computer system of claim 13, further comprising the program instructions executable to:

determine, by the computer, whether a computing resource is available;

in response to determining the computing resource being available, proceed, by the computer, with execution of the first stage of the first training job;

in response to determining the computing resource being not available, determine, by the computer, whether all computing resources are used by one or more other first stage training jobs;

in response to determining the all computing resources being used by the one or more other first stage training jobs, delay, by the computer, the first stage of the first training job until one of the one or more other first stage training jobs is finished;

in response to determining not all computing resources being used by the one or more other first stage training jobs, delay, by the computer, the first stage of the first training job until a final epoch of a currently executed second stage training job is finished.

17. The computer system of claim 13, further comprising the program instructions executable to:

determine, by the computer, whether a computing resource is available;

in response to determining the computing resource being available, proceed, by the computer, with execution of the second stage of the first training job;

in response to determining the computing resource being not available, determine, by the computer, whether all computing resources are used by one or more first stage training jobs;

in response to determining the all computing resources being used by the one or more first stage training jobs, delay, by the computer, the second stage of the first training job until one of the one or more first stage training jobs is finished;

in response to determining not all computing resources being used by the one or more first stage training jobs, determine, by the computer, whether a currently executed second stage training job has a lower priority than the second stage of the first training job;

in response to determining the currently executed second stage training job having the lower priority, delay, by the computer, the second stage of the first training job until a final epoch of the currently executed second stage training job is finished; and in response to determining the currently executed second stage training job not having the lower priority, delay, by the computer, the second stage of the first training job until one of following conditions is met: one of the one or more other first stage training jobs is finished and an upper limit of training epochs of the currently executed second stage training job is reached.

* * * * *